US012488025B2

(12) United States Patent
Al-Shehab et al.

(10) Patent No.: US 12,488,025 B2
(45) Date of Patent: Dec. 2, 2025

(54) COMPUTER-BASED SYSTEMS CONFIGURED FOR INSTANCE DEPENDENT OPTIMIZATION OF INFORMATION PROCESSING SYSTEMS AND METHODS OF USE THEREOF

(71) Applicant: Capital One Services, LLC, McLean, VA (US)

(72) Inventors: Ali S. Al-Shehab, Medford, MA (US); Jr-Wei Jeng, Marlboro, NJ (US); Niti N. Sheth, Edison, NJ (US); Tanveer Afzal Faruquie, Scarsdale, NY (US); David Edward Lutz, Tarrytown, NY (US); Nathan L. Sheridan, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/603,901

(22) Filed: Mar. 13, 2024

(65) Prior Publication Data

US 2025/0291817 A1   Sep. 18, 2025

(51) Int. Cl.
  *G06F 16/28*   (2019.01)
  *G06F 16/22*   (2019.01)
  *G06F 40/295*  (2020.01)
(52) U.S. Cl.
  CPC ........ *G06F 16/287* (2019.01); *G06F 16/2237* (2019.01); *G06F 40/295* (2020.01)

(58) Field of Classification Search
  CPC ... G06F 16/287; G06F 16/2237; G06F 40/295
  See application file for complete search history.

(56) References Cited

U.S. PATENT DOCUMENTS

| 9,535,902 | B1* | 1/2017 | Michalak | G06F 16/3331 |
| 10,768,920 | B2* | 9/2020 | Fontoura | G06F 8/65 |
| 11,294,937 | B1* | 4/2022 | Beskales | G06F 16/285 |
| 11,330,009 | B2 | 5/2022 | Liu et al. | |
| 11,538,029 | B2 | 12/2022 | Young et al. | |
| 11,853,700 | B1* | 12/2023 | Funk | G06F 40/30 |
| 2019/0138653 | A1* | 5/2019 | Roller | G06F 40/35 |
| 2019/0278777 | A1* | 9/2019 | Malik | G06F 16/9024 |
| 2020/0372075 | A1* | 11/2020 | Rogynskyy | G06F 40/295 |
| 2020/0409945 | A1* | 12/2020 | Chen | G06F 16/24578 |
| 2021/0342541 | A1* | 11/2021 | Taylor | G06F 16/3328 |

(Continued)

OTHER PUBLICATIONS

Maidasani et al., "Entity Resolution Evaluation Measures," Department of Computer Science, University of Maryland, College Park, Maryland, 24 pages (May 17, 2012). (Year: 2012).*

(Continued)

*Primary Examiner* — Matthew J Ellis
(74) *Attorney, Agent, or Firm* — Greenberg Traurig, LLP

(57) ABSTRACT

In order to facilitate entity resolution, systems and methods include a processor receiving a plurality of records associated with one or more entity records. The processor utilizes a first natural language processing model to determine a set of clusters. The processor then utilizes instance inputs to determine adjustments to the natural language processing model to determine from the groups of clusters a second map of clusters from the entity feature, then determines a merge of the entity records, and displays the merged entity records.

17 Claims, 5 Drawing Sheets

(56) References Cited

U.S. PATENT DOCUMENTS

2021/0357378 A1* 11/2021 Urdiales .................. G06N 3/08
2022/0374735 A1* 11/2022 Rathod ............... G06F 16/9024
2023/0316186 A1* 10/2023 Miller ..................... G06F 40/40
705/7.25

OTHER PUBLICATIONS

R. Mendes, J.P. Vilela, "Privacy-preserving data mining: methods, metrics, and applications", IEEE Access, 5 (2017), p. 10562-10582 (Year: 2017).*

* cited by examiner

COMPUTER-BASED SYSTEMS CONFIGURED FOR INSTANCE DEPENDENT OPTIMIZATION OF INFORMATION PROCESSING SYSTEMS AND METHODS OF USE THEREOF

FIELD OF TECHNOLOGY

The present disclosure generally relates to computer-based information processing systems configured for one or more novel technological applications of instance dependent optimization of resolving entity records by utilizing machine learning models in an enhanced elastic search environment.

BACKGROUND OF TECHNOLOGY

Resolving entity records in real-time in the age of big data is a technically challenging problem. Data is virtually limitless and increases at an exponential rate. Data can be retrieved from many different sources and depending on the source, the quality of the data can be high, or as in most cases it can be low. A big data entity resolution information processing system may handle tens of millions of data records. Data derived from multiple sources is typically error prone, containing duplicates, misspellings, text or numerical transpositions, and many other forms of "noise". Thus, entity record resolution in the age of big data is an astoundingly difficult problem, especially in real-time when the number of entity records exceeds tens of millions.

SUMMARY OF DESCRIBED SUBJECT MATTER

In some aspects, the techniques described herein relate to a computer-implemented method including: receiving, by at least one processor, multiple data records associated with multiple entity records, each entity record having at least one data entry, the plurality of data records corresponding to at least one candidate entity record; wherein each of the plurality of data record entries includes: i) a quantity data record entry representing a quantity associated with the at least one candidate entity record; ii) a name data record entry representing a name associated with the at least one candidate entity record; iii) an address data record entry representing an address associated with at least one candidate entity record; iv) a second set of data entry records representing at least one attribute associated with at least one candidate entity record; identifying, by at least one processor, a respective set of candidate entity record feature vectors associated with the at least one candidate entity record based on at least one of the entries of the plurality of data record entries; identifying, by at least one processor, at least one group of data record entries feature vectors associated with the second set of data entry records; utilizing, by at least one processor, at least one machine learning model to map clusters based on the at least one group of data record entries feature vectors associated with the respective set of candidate entity record feature vectors; utilizing, by at least one processor, an ingestion module to index the at least one group of data record entries feature vector clusters associated with the respective candidate entity record into an elastic search; wherein the ingestion module is configured to index the at least one group of data entries clusters associated with the respective candidate entity record clusters; determining, confidence bands of each cluster associated with the at least one respective candidate entity record based at least in part on an attribute of the at least one group of data record entries; determining at least one updated machine learning model by updating at least one parameter of the at least one machine learning model based on at least one entry from a pre-determined list; determining at least one updated group of the at least one group of data record entries feature vectors based on at least one entry from a pre-determined list; utilizing at least one updated machine learning model to map a second set of clusters of the updated group of data record entries feature vectors associated with the respective set of candidate entity records feature vectors; determining updated confidence bands of each cluster of the updated group of data record entries associated with the respective set of candidate entity records displaying each cluster of the updated group of data record entries associated with the respective candidate entity records and corresponding updated confidence bands.

In some aspects, the techniques described herein relate to a system including: a non-transient computer memory, storing software instructions; and a least one processor of a first computing devices associated with a user; wherein, then at least one processor executes the software instructions, the first computing device is programmed to: receive, by at least one processor, multiple data records associated with multiple entity records, each entity record having at least one data entry, the plurality of data records corresponding to at least one candidate entity record; wherein each of the plurality of data record entries includes: i) a quantity data record entry representing a quantity associated with the at least one candidate entity record; ii) a name data record entry representing a name associated with the at least one candidate entity record; iii) an address data record entry representing an address associated with at least one candidate entity record; iv) a second set of data entry records representing at least one attribute associated with at least one candidate entity record; identify, by at least one processor, a respective set of candidate entity record feature vectors associated with the at least one candidate entity record based on at least one of the entries of the plurality of data record entries; identify, by at least one processor, at least one group of data record entries feature vectors associated with the second set of data entry records; utilize, by at least one processor, at least one machine learning model to map clusters based on the at least one group of data record entries feature vectors associated with the respective set of candidate entity record feature vectors; utilize, by at least one processor, an ingestion module to index the at least one group of data record entries feature vector clusters associated with the respective candidate entity record into an elastic search; wherein the ingestion module is configured to index the at least one group of data entries clusters associated with the respective candidate entity record clusters; determine confidence bands of each cluster associated with the at least one respective candidate entity record based at least in part on an attribute of the at least one group of data record entries; determine at least one updated machine learning model by updating at least one parameter of the at least one machine learning model based on at least one entry from a pre-determined list; determine at least one updated group of the at least one group of data record entries feature vectors based on at least one entry from an pre-determined list; utilize at least one updated machine learning model to map a second set of clusters of the updated group of data record entries feature vectors associated with the respective set of candidate entity records feature vectors; determine updated confidence bands of each cluster of the updated group of data record entries associated with the respective set of candidate entity records displaying each cluster of the updated group of data record entries associated with the respective candidate entity records and corresponding updated confidence bands.

In some aspects, the techniques described herein relate to at least one computer-readable storage medium having encoded thereon software instructions that, when executed by at least one processor, cause the at least one processor to perform steps to: receive, by at least one processor, multiple data records associated with multiple entity records, each entity record having at least one data entry, the plurality of data records corresponding to at least one candidate entity record; wherein each of the plurality of data record entries includes: i) a quantity data record entry representing a quantity associated with the at least one candidate entity record; ii) a name data record entry representing a name associated with the at least one candidate entity record; iii) an address data record entry representing an address associated with at least one candidate entity record; iv) a second set of data entry records representing at least one attribute associated with at least one candidate entity record; identify, by at least one processor, a respective set of candidate entity record feature vectors associated with the at least one candidate entity record based on at least one of the entries of the plurality of data record entries; identify, by at least one processor, at least one group of data record entries feature vectors associated with the second set of data entry records; utilize, by at least one processor, at least one machine learning model to map clusters based on the at least one group of data record entries feature vectors associated with the respective set of candidate entity record feature vectors; utilize, by at least one processor, an ingestion module to index the at least one group of data record entries feature vector clusters associated with the respective candidate entity record into an elastic search; wherein the ingestion module is configured to index the at least one group of data entries clusters associated with the respective candidate entity record clusters; determine confidence bands of each cluster associated with the at least one respective candidate entity record based at least in part on an attribute of the at least one group of data record entries; determine at least one updated machine learning model by updating at least one parameter of the at least one machine learning model based on at least one entry from a pre-determined list; determine at least one updated group of the at least one group of data record entries feature vectors based on at least one entry from a pre-determined list; utilize at least one updated machine learning model to map a second set of clusters of the updated group of data record entries feature vectors associated with the respective set of candidate entity records feature vectors; determine updated confidence bands of each cluster of the updated group of data record entries associated with the respective set of candidate entity records displaying each cluster of the updated group of data record entries associated with the respective candidate entity records and corresponding updated confidence bands.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
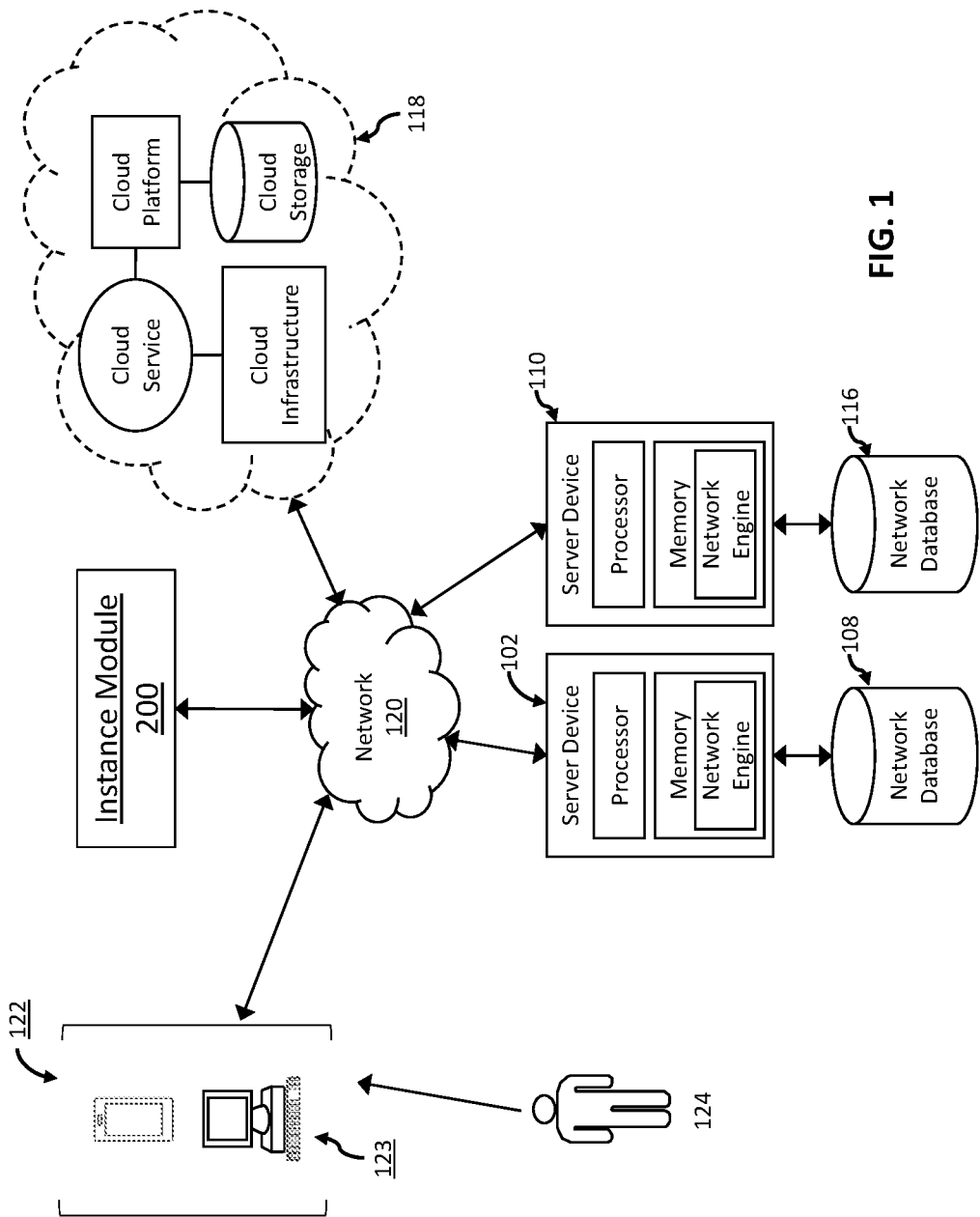
FIG. 1 is a block diagram of an illustrative computer-based information processing system configured for one or more novel technological application of instance dependent optimization for entity resolution in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Entity resolution of an entity record among multiple entity records is a challenging task as detailed above for several reasons. The amount of publicly available information about an entity is typically quite large, exists in multiple databases, and it is typically noisy.

Typical entity record resolution systems (e.g., capable of resolving tens of millions of records) are computer system resource intensive, require thousands of processing nodes, and trillions of bytes of memory. These information processing systems, although extremely powerful, are still incapable of resolving entity records on an instance (e.g., instance dependent optimization) basis with conventional programming techniques. Typical entity resolution systems still require a considerable amount of human intervention in terms of resolving data records and refinement of training data in the case where machine learning techniques are employed. Thus, what is needed in the art of computer-based information processing systems capable of resolving entity records among multiple entity records is a method and system that is capable of resolving entity records without human intervention, that increases the speed of entity resolution while simultaneously reducing the load on system nodes and memory.

This disclosure contemplates a system capable of instance dependent optimization utilizing independently trained machine learning models for information processing systems processing entity records. The system is capable of automatically optimizing based on the (e.g., instance dependent) characteristics of an entity record, the parameters of a machine learning model, and data management systems that handle processing, resulting in more precise data refinement, reduced and/or completely automated training of the model (e.g., no human intervention) increasing the speed of the information processing system by a minimum of 2 folds while simultaneously reducing memory storage capacity requirements.

In some embodiments the system and method for resolving entity records from multiple entity records may be configured with an illustrative instance module capable of independently resolving entity records. The system and method may include independently trained machine learning models and an enhanced elastic search environment to resolve entity records. In some embodiments, the system and method for resolving entity records may be configured to operate as part of a broader computer-based system as such in at least one virtual computer of a network, at least one server device, at least one cloud platform, at least one mobile computing device, at least one personal computing device, or any similar computing device capable of carrying out entity record resolution and accessible to at least one end user or any combination thereof.

In some embodiments the illustrative instance module may be configured to retrieve multiple data records of multiple entity records, the data records associated with a candidate entity record from a storage device of the illustrative instance module, or it may be configured to retrieve multiple data records from a storage system in a network, cloud storage of a cloud platform, a network database, a server device, a mobile computing device, or a personal computing device or any similar computing device or any combination thereof capable storing data records or any combination thereof.

In some embodiments multiple data records associated with multiple entity records may include a quantity data record entry that represents a quantity associated with the at least one candidate entity record. The quantity data record may be a numeric quantity such as a phone number, a zip code, a currency based revenue quantity, a debt quantity, a quantity associated with a number of employees or any other similar numeric quantity that may represent a data record of multiple data records associated with a candidate entity record.

In some embodiments multiple data records may include a name data entry representing a name associated with the at least one candidate entity record. The name data entry may include text characters associated with a business name such as for example "mid-town laundry service" or "Professional Staffing". The name data entry may include at least one descriptive text character that provides a description of the business but may include several text characters that provide a description of the business.

In some embodiments multiple data records may include a data entry representing an address associated with at least one candidate entity record such as for example "Peachtree street" or "Langford street". The data entry may include text characters such as a street name, or it may include numeric characters such as "679" or "5611". The data entry may include numeric characters or text characters or both. In some embodiments the data entry representing an address may include geographic data that can be used to determine a geographic location such as latitude and longitude coordinates, geodata, geospatial data such as vectors and attributes, a street address, one or more landmarks, one or more intersections, or any similar type of data related to information about a location or any combination thereof.

In some embodiments multiple data records may include a second set of data entry records representing at least one attribute associated with at least one candidate entity record. The second set of data entry records may include any combination of a quantity, a name, an address, or any similar numeric character or text character that may be information related to an entity record. In some embodiments the second set of data entry records may include descriptive text that describes at least a part of at least one entity record associated with a candidate entity record. The descriptive text may be automatically generated by analysis of multiple entity records such as for example at least one machine learning model. In some embodiments the at least one machine learning model may determine embeddings of feature vectors of text of multiple data entry records and from those embedding determine a group that belongs to a certain category such as "restaurants". In some embodiments the second set of data entry records may include descriptive text that describes at least one entity record associated with at least one candidate entity record, the descriptive text including information that may be curated information such as for example, previous attempts to obtain a line of credit, a history of credit scores, or any similar type of information that may refine the resolution of an entity record.

In some embodiments the illustrative instance module utilizing at least one processor(s), may employ a combination of character recognition to identify alphanumeric characters, and semantic segmentation to identify information represented by the characters, including, e.g., neural networks and other classifiers for semantic segmentation.

In some embodiments the illustrative instance module may include a computing system having multiple components interconnect through, e.g., a communication bus. In some embodiments, the communication bus may be a physical interface for interconnecting the various components, however in some embodiments, the communication bus may be a network interface, router, switch, or other communication interface. The illustrative instance module may receive multiple data records associated with multiple entity records, each of multiple entity records corresponding to a respective candidate entity record.

In some embodiments the communication bus of the illustrative instance module may be communicatively coupled with at least one processor(s), at least one storage device, at least one system memory (RAM) at least one read only memory (ROM), at least one network interface, at least one output device interface (e.g., monitor, printer) a least one input device interface (e.g., mouse, keyboard) whereby a user may interact with the system.

In some embodiments the illustrative instance module utilizing at least one processor(s) may determine a respective set of candidate entity record feature vectors associated with the at least one candidate entity record based on at least one of the entries of multiple data record entries.

In some embodiments the illustrative instance module utilizing at least one processor(s) may determine at least one group of data record entries feature vectors associated with the data record entries and the second set of data entry records. In some embodiments the group may be further processed by a sub-module of the illustrative instance module to determine whether any attributes of the group contain an exact match to a pre-determined list. The pre-determined list may contain categories such as high priority, mid-priority, and low priority. The categories may include entries for example a high priority category may contain an entry having information about a credit application, the sub-module may determine whether an exact match in the attributes of the category exists and utilizing this as an input update the group. The sub-module may utilize a heuristic search to determine an exact match, or any similar method of determining exact matches or any combination thereof.

The updated group may be updated to contain fewer data record entries as the sub-module may determine a threshold of high similarity of data record entries that match the candidate entity record, this in turn optimizes processing time, bandwidth, and storage of the system as only records of high similarity are processed.

In some embodiments the illustrative instance module utilizing the at least one processor may determine a similarity of multiple data record entries with multiple candidate entity records by determining a semantic similarity of the embeddings of the feature vectors, or it may determine a similarity based on a classifier or any similar type of measure capable of determining a similarity.

In some embodiments the communication bus of the illustrative instance module may be configured with at least one entity feature engine. The at least one entity feature engine may be a machine learning model, for example a natural language processing model. The at least one entity feature engine capable of processing feature vectors of multiple data records associated with a candidate entity record.

In some embodiments the communication bus of the illustrative instance module may be configured with at least one fine feature engine. The at least one fine feature engine may be a machine learning model, for example a deep learning natural language processing model. The at least one fine feature engine capable of processing feature vectors of multiple data records associated with a candidate entity record at a finer resolution. In some embodiments, the parameters of the at least one fine feature engine may be updated based on model parameters of at least one first deep learning natural language processing model.

In some embodiments the illustrative instance module may be configured with at least one entity feature engine and at least one fine feature engine, where each of the entity feature engine and the fine feature engine may be based on a deep learning natural language processing architecture having at least one input layer, at least one hidden layer, and at least one output layer, the at least one entity feature engine and the at least one fine feature engine processing the feature vector inputs by a numerical optimization of the connections and weights of the at least one hidden layer to derive an output layer representing embeddings of feature vectors of the input of multiple entity records. The at least one entity feature engine and the at least one fine feature engine is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments the at least one entity feature engine and the at least one fine feature engine of the illustrative instance module may be configured to map clusters of the at least one updated group of data record entries feature vectors associated with the respective set of candidate entity record feature vectors, each cluster representing a candidate entity record and the associated multiple data record entries.

In some embodiments the illustrative instance module may utilize an ingestion engine to index into an elastic search environment the at least one group of data record entries feature clusters associated with each respective candidate entity record. In some embodiments the at least one processor(s) of the illustrative instance module may employ delimiter-based parsing or fixed-length parsing, or combinations thereof, to parse the clusters of data associated with each respective candidate entity record into an elastic search environment.

In some embodiments the illustrative instance module may utilize a display engine capable of displaying multiple candidate entity records and associated information such as statistics, attributes of at least one group of data record entries, confidence intervals associated with multiple candidate entity records and the like.

In some embodiments the at least one processor(s) of the illustrative instance module may determine a confidence interval of each cluster associated with the at least one respective candidate entity record based at least in part on an attribute of the at least one group of data record entries. In some embodiments the confidence interval may be determined by employing a method of moments where the quantity to be estimated is the population mean of each cluster of the data record entries associated with a candidate entity record, in which case one estimate is the sample mean. The sample variance of each respective cluster may be utilized to determine a population variance, the confidence interval for the true mean of each respective cluster may be centered on the sample mean with a width which is a multiple of the square root of the sample variance. The illustrative instance module is not limited to employing a method of moments for determining a confidence interval of each respective cluster, but may employ a maximum likelihood method, a bootstrapping method, or any similar method that may yield a confidence interval.

In some embodiments, the illustrative instance module may utilize the at least one sub-module to determine a high priority, a mid-priority, and a low priority confidence interval based on an entry of a category of a pre-determined list. In some embodiments the ranges may be represented as a high priority where a 95% confidence interval may be predicted for data record entries associated with the respective candidate entity record, a mid-priority where a 75% confidence interval may be predicted for data record entries associated with the respective candidate entity record, and a low priority where a 50% confidence interval may be predicted for data record entries associated with the respective candidate entity record.

In some embodiments the at least one sub-module of the illustrative instance module may utilize at least one of the confidence intervals based at least in part on an attribute of at least one group of data record entries associated with a respective candidate entity record has an exact match with an entry from a pre-determined list, the pre-determined lists may include categories such as high priority, mid-priority, and low priority, and an entry may be associated with each category. In some embodiments, a confidence interval may be determined based on an exact match of the at least one group of data record entries with an entry from the pre-determined list.

In some embodiments, an attribute of at least one group of data record entries associated with a respective candidate entity record may belong to a high priority list in the case where an attribute of at least one data record entries is related to high risk category where an error in entity record resolution represents a significant risk for example, a line of credit, a credit card application, a loan application, a credit score inquiry, or any similar attribute that requires finer resolution of entity record data. In some embodiments, an attribute of at least one group of data record entries associated with a respective candidate entity record may belong to a mid-priority list in the case where the purpose of resolving the entity record is related to mid-risk activities such as a marketing campaign that utilizes telecommunications means for marketing to a group of entities that may be resolved from multiple candidate entity records. The mid-priority list may include a group of entities to which for example physical mail may be directed. The mid-priority list may include an entry that matches any type of attribute of at least one group of data record entries that does not represent a significant risk in the case of a high proportion of errors in the resolution of multiple entity records, but a level of risk tolerance is acceptable. In some embodiments, an attribute of at least one group of data record entries associated with a respective candidate entity record may belong to a low priority list in the case where the purpose of resolving the entity record is related to activities that utilizes email as a form of communication, it may include activities such as automated telecommunications, or any similar type of activities that represent low risk activities and a high level of risk tolerance is acceptable.

In some embodiments the illustrative instance module may utilize the at least one sub-module to determine an update for at least one parameter of the at least one fine feature engine, the update may be based on at least one entry from a pre-determined list. The sub-module may determine that the at least one entry from the pre-determined list stored in a local storage device is an exact match of an entry of the at least one group of data record entries, such as for example, in the case where the at least one entry from the pre-determined list belongs to a low priority category, the at least one processor(s) determines a new set of parameters for the at least one hidden layer of the at least one fine feature engine where the connections of the at least one hidden layer are strengthened. In some embodiments the connections of the at least one hidden layer may be strengthened in a range of 1-5%, 5-10%, 10-15%, or 15-20% or any combination thereof. In some embodiments strengthening the connections of the at least one hidden layer in this manner increases the probability of matches to be determined by the model, and therefore the system determines an increased number of entity records. Conversely, in the case where the at least one input is determined to be a high priority the connections of the at least one hidden layer may be weakened in a range of 1-5%, 5-10%, 10-15%, or 15-20% or any combination thereof which decreases the probability of matches to be determined by the model, and thus the system determines fewer matches to the candidate entity record from the entity records. In some embodiments the illustrative instance module may utilize the at least one processor(s) to determine at least one parameter of the at least one entity feature engine by updating at least one parameter of the at least one entity feature engine based on at least one entry matching a pre-determined list in a similar manner.

In some embodiments the sub-module of the illustrative instance module may utilize the at least one sub-module to determine an update for the at least one parameter of the at least one fine feature engine, the update may be based on at least one entry of the pre-determined list. The sub-module may determine that the at least one entry from the pre-determined list stored in a local storage device is an exact match of an entry of the at least one group of data record entries, such as for example, in the case where the at least one entry from the pre-determined list is determined to be a low priority input, the at least one sub-module determines a new set of parameters for the at least one hidden layer of the at least one fine feature engine where the weights of the at least one hidden layer are strengthened. In some embodiments the weights of the connections may be strengthened in a range of 1 to 25%, such as 1-5%, 5-10%, 10-15%, or 15-20%. Similarly, as described above, strengthening the weights of the connections of the model increase the likelihood of the system determining matches to the candidate entity record from the entity records. In some embodiments in the case where the at least one entry from the pre-determined list is determined to be a high priority the weights of the connections may be weakened in a range of 1 to 25%, such as 1-5%, 5-10%, 10-15%, or 15-20%, decreasing the weights of the model decreases the likelihood of the system determining matches to the candidate entity record from the entity records. In some embodiments the illustrative instance module may utilize the at least one processor(s) to determine at least one parameter of the at least one entity feature engine by updating at least one parameter of the at least one entity feature engine based on at least one entry from a pre-determined list in a similar manner. In the above described cases, increasing and decreasing the connection strengths and weights of the model based on the at least one entry from the pre-determined list optimizes the system by decreasing processing times by at least 2 folds, decreases memory load, data handling and data transfer of the information processing system.

In some embodiments the illustrative instance module may utilize the at least one sub-module to determine at least one updated group of the at least one group of data record entries feature vectors based on at least one entry matching at least one entry of a pre-determined category. The sub-module may determine that the at least one entry from the pre-determined list stored in a local storage device is an exact match of an entry of the at least one group of data record entries, such as in the case where the at least one entry exactly matches an entry from the pre-determined list of a high priority category the group of data record entries from the previously processed group of data record entries, the number of data record entries of the updated group may be limited to be between 1-1,000 entries, in the case where the at least one entry from the pre-determined list is a mid-priority the updated group may be limited to be between 1,000-5,000 entries and in the case where the at least one entry from the pre-determined list is a low priority the updated group may be limited to be between 5,000-10,000 entries.

In some embodiments the illustrative instance module may utilize at least one fine feature engine to map a second set of clusters of the updated group of data record entries feature vectors associated with the respective set of candidate entity record feature vectors. In some embodiments the illustrative instance module may utilize at least one updated machine learning model to map a second set of clusters of the updated group of data record entries feature vectors associated with the respective set of candidate entity records feature vectors.

FIGS. 1 through 5 illustrate systems and methods of database communication, data collection and processing, data visualization, index generation. The following embodiments provide technical solutions and technical improvements that overcome technical problems, drawbacks or deficiencies in the technical fields involving database inefficiencies, database interoperability, data accuracy and data portability, among others. As explained in more detail, below, technical solutions and technical improvements herein include aspects of improved machine learning, entity resolution, database interoperability, service interoperability, among others. Based on such technical features, further technical benefits become available to users and operators of these systems and methods. Moreover, various practical applications of the disclosed technology are described, which provide further practical benefits to users and operators that are new and useful improvements in the art.

FIG. 1 is a block diagram of an illustrative computer-based system configured for one or more novel technological applications of instance dependent optimization of entity resolution capable of both batch and real-time processing for efficient dataset resolution in accordance with one or more embodiments of the present disclosure.

In some embodiments the computer-based information processing systems and methods configured for instance dependent optimization of resolving entity records by utilizing machine learning models may be configured to operate independently as an illustrative instance module 200. In some embodiments, the systems and methods may be configured to operate in a network 120, a cloud platform 118, a server device 102 in communication with a network database 108, a server device 110 in communication with a network database 116, a mobile computing device 122, or a personal computing device 123, or any similar type of computing device accessible to a user 124. In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 2:
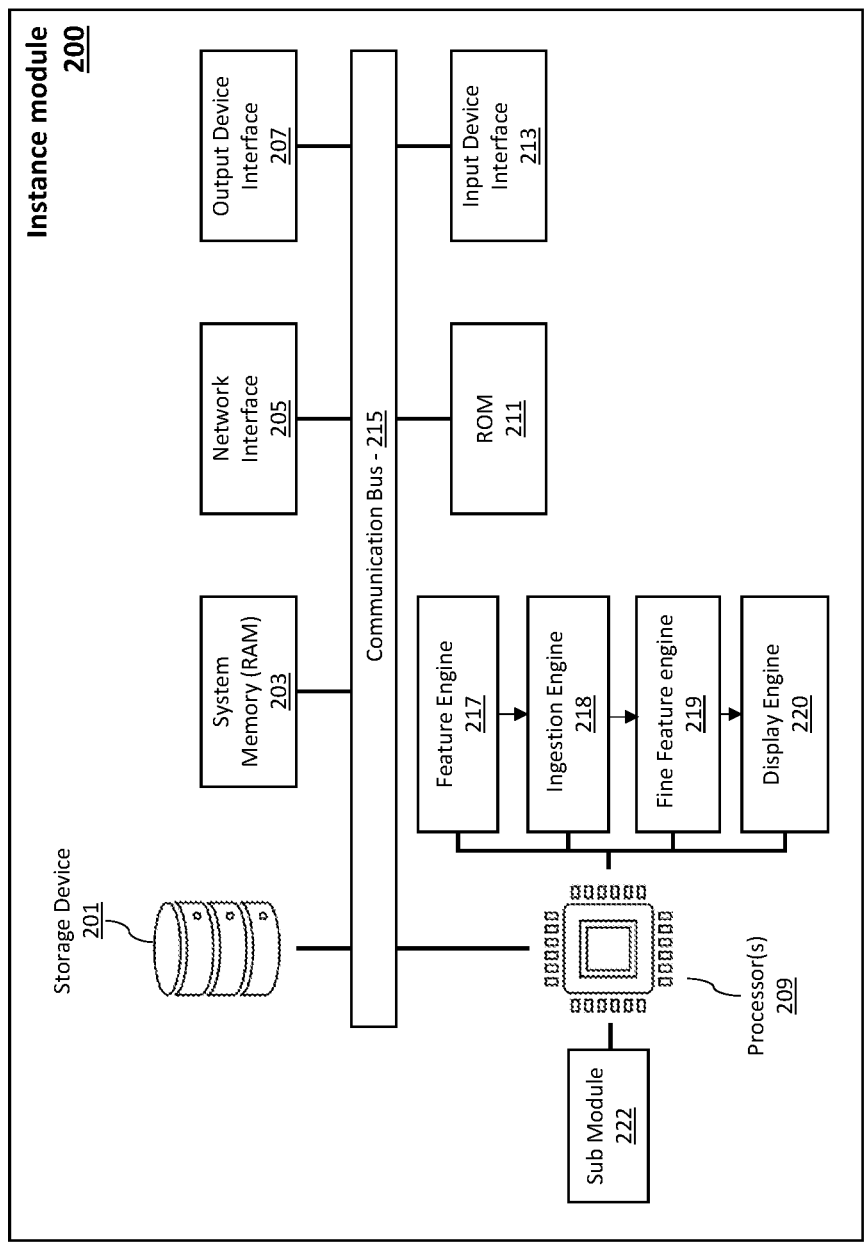
FIG. 2 depicts a block diagram of an exemplary computer-based instance module for resolving entity records of multiple entity records in accordance with one or more embodiments of the present disclosure.

FIG. 2 depicts a block diagram of an exemplary computer-based instance module for resolving entity records of multiple entity records in accordance with one or more embodiments of the present disclosure.

In some embodiments the illustrative instance module 200 may be configured with a communication bus 215, the bus 215 may be communicatively coupled with at least one processor(s) 209, at least one storage device 201, at least one system memory (RAM) 203 at least one read only memory (ROM) 211, at least one sub-module 222 at least one network interface 205, at least one output device interface 207 (e.g., monitor, printer) a least one input device interface 213 (e.g., mouse, keyboard) whereby a user 124 may interact with the system.

In some embodiments the illustrative instance module 200 includes a computing system having multiple components interconnect through, e.g., a communication bus 215. In some embodiments, the communication bus 215 may be a physical interface for interconnecting the various components, however in some embodiments, the communication bus 215 may be a network interface, router, switch, or other communication interface.

In some embodiments the illustrative instance module 200 may receive multiple data records associated with multiple entity records, each of multiple entity records corresponding to a respective candidate entity record.

In some embodiments the illustrative instance module 200 utilizing at least one processor(s) 209 may determine a respective set of candidate entity record feature vectors associated with the at least one candidate entity record based on at least one of the entries of multiple data record entries. In some embodiments the illustrative instance module 200 utilizing at least one processor(s) 209 may determine at least one group of data record entries feature vectors associated with a second set of data entry records. In some embodiments the illustrative instance module 200 utilizing the at least one processor(s) 209 may determine a similarity of multiple data record entries with multiple candidate entity records by determining a semantic similarity of the embeddings of the feature vectors, or it may determine a similarity based on a classifier or any similar type of measure capable of determining a similarity.

In some embodiments the communication bus 215 of the illustrative instance module 200 may be configured with at least one entity feature engine 217 and at least one fine feature engine 219 for processing feature vectors of multiple data records associated with a candidate entity record, the at least one entity feature engine 217 and the at least one fine feature engine 219 may be based on a deep learning natural language processing architecture having at least one input layer, at least one hidden layer, and at least one output layer, the at least one entity feature engine 217 and the at least one fine feature engine 219 processing the feature vector inputs by a numerical optimization of the connections and weights of the at least one hidden layer to derive an output layer representing embeddings of feature vectors of the input of multiple entity records. The at least one entity feature engine 217 and the at least one fine feature engine 219 is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of feature vectors of multiple entity records.

In some embodiments the at least one entity feature engine 217 and the at least one fine feature engine 219 of the illustrative instance module 200 may be configured to receive the at least one group of data record entries and/or the at least one updated group of data record entries. In some embodiments the at least one group of data record entries may include entity records associated with at least one candidate entity records. The at least one group and/or updated group of data record entries may be further processed by at least one sub-module 222 of the illustrative instance module 200 to include attributes of data record entries having an exact match with an entry associated with a category of a pre-determined list. The illustrative instance module 200 may be configured to map clusters based on the at least one group and/or updated group of data record entries feature vectors associated with the respective set of candidate entity record feature vectors, each cluster representing a candidate entity record and the associated multiple data record entries.

In some embodiments the illustrative instance module 200 may utilize an ingestion engine 218 to index into an elastic search environment the at least one group of data record entries feature clusters associated with each respective candidate entity record. In some embodiments the at least one processor(s) 209 of the illustrative instance module 200 may employ delimiter-based parsing or fixed-length parsing, or combinations thereof, to parse the clusters of data associated with each respective candidate entity record into an elastic search environment.

In some embodiments the illustrative instance module 200 may utilize a display engine 220 capable of displaying multiple candidate entity records and associated information such as statistics, attributes of at least one group of data record entries, confidence intervals associated with multiple candidate entity records and the like.

In some embodiments the illustrative instance module may utilize at least one sub-module 222. In some embodiments the at least one sub-module 222 may be configured to automatically update a group of entity records to be processed by the illustrative instance module 200. In some embodiments the at least one sub-module 222 may be configured to automatically update at least one parameter of the fine feature engine 219. In some embodiments the at least one sub-module may automatically determine an update based on a comparison of an attribute of the at least one group of data record entries with a pre-determined list stored in the local storage device 201.

In some embodiments the at least one sub-module 222 of the illustrative instance module 200 may be configured to update a group of entity records to be processed by the illustrative instance module 200 based on at least one input of a user 124. In some embodiments the at least one sub-module 222 may be configured to update at least one parameter of the fine feature engine 219. In some embodiments the at least one sub-module may determine an update based on a comparison of an attribute of the at least one group of data record entries with a pre-determined list stored in the local storage device 201.

In some embodiments the at least one processor(s) 209 of the illustrative instance module 200 may determine a confidence interval of each cluster associated with the at least one respective candidate entity record based at least in part on an attribute of the at least one group of data record entries. In some embodiments the confidence interval may be determined by employing a method of moments where the quantity to be estimated is the population mean of each cluster of the data record entries associated with a candidate entity record, in which case one estimate is the sample mean. The sample variance of each respective cluster may be utilized to determine a population variance, the confidence interval for the true mean of each respective cluster may be centered on the sample mean with a width which is a multiple of the square root of the sample variance. The illustrative instance module 200 is not limited to employing a method of moments for determining a confidence interval of each respective cluster, but may employ a maximum likelihood method, a bootstrapping method, or any similar method that may yield a confidence interval.

In some embodiments, the illustrative instance module 200 may utilize the confidence interval to determine a priority associated with each cluster. In some embodiments, the priority may represent a risk factor in the error of resolving an entity record, such as for example if the risk factor for an error is high, then the system determines a high confidence interval such as 90%, 95%, 97%, 99%, 99.9% or other threshold for high confidence, including any value in a range of about 80% to 99%. A high confidence interval reduces the number of records to process, thus optimizing the information processing capabilities of the system. In some embodiments, the illustrative instance module 200 may utilize the at least one processor(s) 209 to determine a high priority, a mid-priority, and a low priority confidence interval. In some embodiments the ranges may be represented as a high priority where a threshold level of confidence for a high confidence interval may be predicted for data record entries associated with the respective candidate entity record, a mid-priority where a mid-confidence interval such as 75%, 70%, 65% or other threshold for mid confidence interval, including any value in a range of about 60-79% may be predicted for data record entries associated with the respective candidate entity record, and a low priority where a low confidence interval such as 55%, 50%, 45%, or other threshold for low confidence, including any value in a range of about 40-59% may be predicted for data record entries associated with the respective candidate entity record. In some embodiments, while three confidence intervals (high, mid and low) are detailed above, the above principles may also apply to other numbers of confidence intervals having associated confidence level thresholds, such as, e.g., 1, 2, 3, 4, 5, 6, 7, 8, 9, 10 or more confidence intervals.

In some embodiments the illustrative instance module 200 may utilize at least one of the confidence intervals based at least in part on an attribute of at least one group of data record entries associated with a respective candidate entity record belongs to a pre-determined list in local storage device 201, an entry of pre-determined lists may be associated with the high priority, mid-priority, and low priority categories of confidence intervals. In some embodiments, an attribute of at least one group of data record entries associated with a respective candidate entity record may belong to a high priority pre-determined list associated with a high priority confidence interval in the case where the attribute is related to high risk activities where an error in entity record resolution represents a significant risk for example, a line of credit, a credit card application, a loan application, a credit score inquiry, or any similar attribute that requires finer resolution of entity record data. In some embodiments, an attribute of at least one group of data record entries associated with a respective candidate entity record may belong to a mid-priority pre-determined list associated with a mid-priority confidence interval in the case where the purpose of resolving the entity record is related to mid-risk activities such as a marketing campaign that utilizes telecommunications means for marketing to a group of entities that may be resolved from multiple candidate entity records. The mid-priority list may include a group of entities to which for example physical mail may be directed. The mid-priority list may include any type of attribute of at least one group of data record entries that does not represent a significant risk in the case of a high proportion of errors in the resolution of multiple entity records, but a level of risk tolerance is acceptable. In some embodiments, an attribute of at least one group of data record entries associated with a respective candidate entity record may belong to a low priority pre-determined list associated with a low priority confidence interval in the case where the purpose of resolving the entity record is related to activities that utilize email as a form of communication, it may include activities such as automated telecommunications, or any similar type of activities that represent low risk activities and a high level of risk tolerance is acceptable.

In some embodiments, the following table may be an example of an illustrative pre-determined list. The illustrative pre-determined list in this example has three category types: high priority, mid-priority, and low priority. The entries of the high priority category may include loan interest rate of 4% and/or less and or a high credit score of 700 or more. In this example, the pre-determined list may be utilized to filter out and/or filter in potential matches from further processing based on information (e.g., attributes of data record entries). The pre-determined list is not limited to utilizing financial information but may utilize any type of information associated with a candidate entity record.

| High Priority | Mid-Priority | Low Priority |
|---|---|---|
| Loan interest rate (e.g., 4% or less) | Loan interest rate (4.01% to 8% | Loan interest rate (8% or more) |
| High credit score (e.g., 700 or more) | Average credit score (e.g., 699 to 500) | Low credit score (e.g., 499 or below |

In some embodiments the illustrative instance module 200 may utilize the at least one processor(s) 209 to determine an update for at least one parameter of the at least one fine feature engine 219, the update may be based on at least one entry from a user 124 from an input device interface 213, and/or it may be automatically determined based on an exact match of an attribute of the data record entries with a pre-determined list. In the case where the at least one entry and or the exact match from the pre-determined list (e.g., automatically determined) is determined to be a high priority, the at least one processor(s) 209 determines a new set of parameters for the at least one hidden layer of the at least one fine feature engine 219 where the connections of the at least one hidden layer are weakened or decreased. In some embodiments the connections of the at least one hidden layer may be decreased in a range of 1 to 25%, such as 1-5%, 5-10%, 10-15%, or 15-20%. In some embodiments in the case where the at least one entry from a user 124, and/or automatically is determined to be a low priority the connections of the at least one hidden layer may be increased in a range of 1 to 25%, such as 1-5%, 5-10%, 10-15%, or 15-20%. In some embodiments the connection strengths may be decreased to decrease the likelihood of matches to the candidate entity record from the entity records and conversely, strengthening connections to increase the likelihood of matches to the candidate entity record from the entity records. In some embodiments the illustrative instance module 200 may utilize the at least one processor(s) 209 to determine at least one parameter of the at least one entity feature engine 217 by updating at least one parameter of the at least one entity feature engine 217 based on at least one entry or it may be determined automatically.

In some embodiments the illustrative instance module 200 may utilize the at least one processor(s) 209 to determine an update for at least one parameter of the at least one fine feature engine 219, the update may be based on at least one entry from the user 124 from an input device interface 213 and/or it may be automatically determined based on an exact match of an attribute of the data record entries from the pre-determined list (e.g., as described above). In the case where the at least one entry from the user 124 and/or determined automatically to be a high priority input, the at least one processor(s) 209 determines a new set of parameters for the at least one hidden layer of the at least one fine feature engine 219 where for example the weights of the at least one hidden layer are weakened. In some embodiments the weights of the connections may be decreased in a range of 1 to 25%, such as 1-5%, 5-10%, 10-15%, 15-20%, or any value within a range of 1-25%. In some embodiments in the case where the at least one entry from a user 124 is determined to be a low priority or automatically determined to be low priority the weights of the at least one hidden layer may be increased in a range of 1-5%, 5-10%, 10-15%, 15-20% or any value within a range of 1-25%. In some embodiments, the weights may be decreased to decrease the likelihood of matches to the candidate entity record from the entity records and conversely, increasing the weights to increase the likelihood of matches to the candidate entity record from the entity records. In some embodiments the illustrative instance module 200 may utilize the sub-module to automatically update at least one parameter of the at least one fine feature engine 219 based on a comparison of an attribute of the at least one group of data record entries with a pre-determined list stored in the local storage device 201.

In some embodiments the illustrative instance module 200 may utilize the at least one processor(s) 209 to determine at least one updated group of the at least one group of data record entries feature vectors based on at least one entry from a user 124 from an input device interface 213 and/or it may be automatically determined based on an exact match of an attribute of the data record entries with a pre-determined list. In the case where the at least one entry from a user 124, and/or automatically is determined to be a high priority the illustrative instance module 200 utilizes the updated group of data record entries from the previously processed group of data record entries, the updated group of data record entries may be limited to a group of between 1-1,000 entries in the case where the at least one entry and/or automatically determined to be a mid-priority the updated group of data record entries may be limited to be a group of between 1,000-5,000 entries, in the case where the at least one entry and/or automatically determined to be a low priority the updated group of data record entries may be limited to be a group of between 5,000-10,000 entries.

In some embodiments the illustrative instance module 200 may utilize at least one fine feature engine 219 to map a second set of clusters of the updated group of data record entries feature vectors associated with the respective set of candidate entity record feature vectors. In some embodiments the illustrative instance module 200 may utilize at least one updated machine learning model to map a second set of clusters of the updated group of data record entries feature vectors associated with the respective set of candidate entity records feature vectors.

Figure 3:
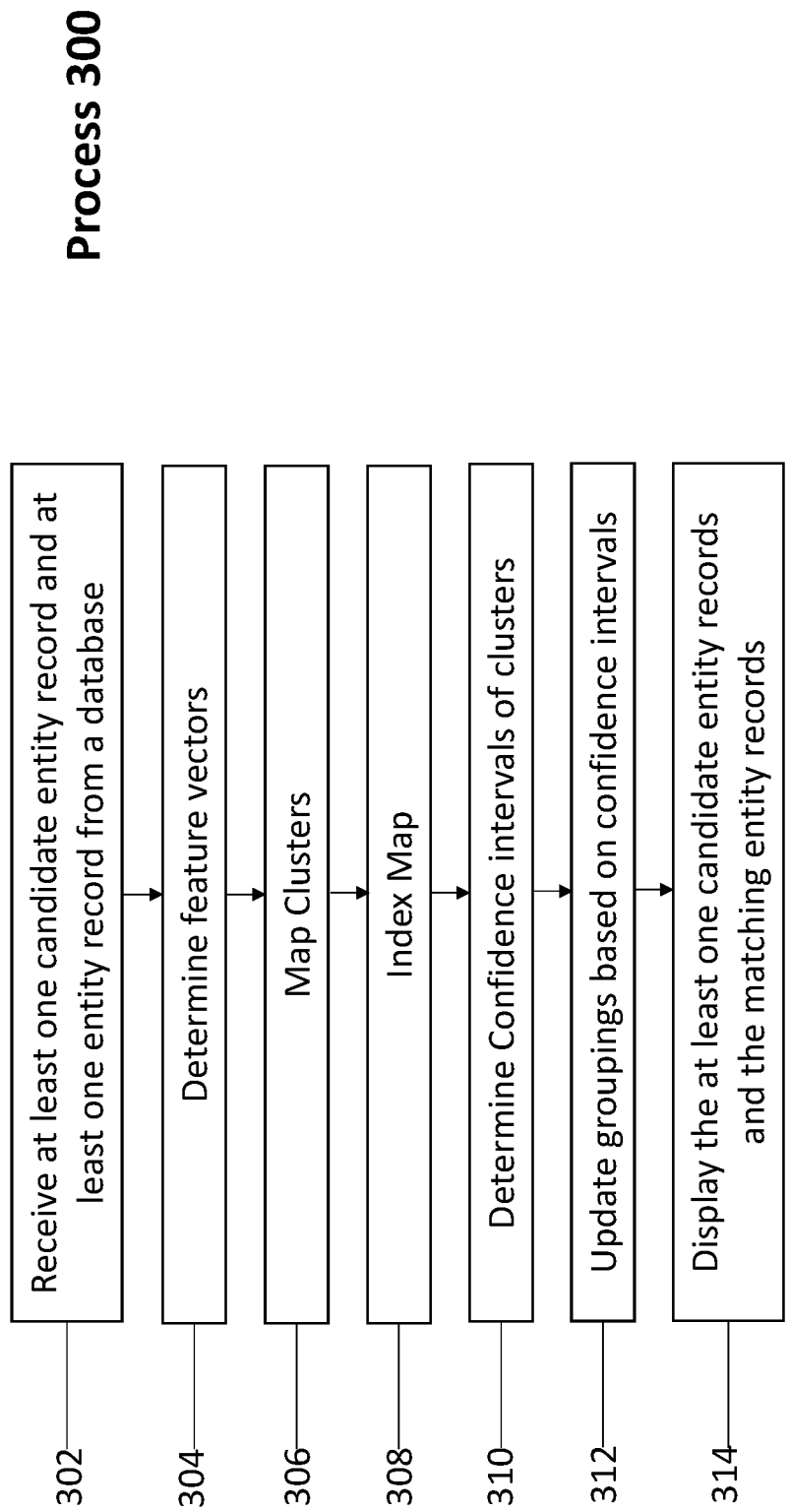
FIG. 3 is a flowchart illustrating operational steps of resolving entity records in accordance with one or more embodiments of the present disclosure.

FIG. 3 is a flowchart illustrating operational steps of process 300 the system capable of instance dependent optimization of resolving entity records in accordance with one or more embodiments of the present disclosure.

In some embodiments at Step 302, the illustrative instance module 200 may receive at least one data record associated with at least one entity record, each of the entity records corresponding to at least one respective candidate entity record. For example, in some embodiments, the instance module 200 may access entity records representative of one or more commercial entities, such as stores, corporations, merchants, service providers, among others or any combination thereof. The entity records for the commercial entities may include data items representative of details associated with the commercial entities. For example, the data items may be representative of, e.g., a business's legal name, an address of a store, headquarters or other place of business, a telephone number, a contact person, a merchant category code, among others or any combination thereof. Other entity records in other contexts may be employed so as to more efficiently search records, e.g., for deduplication, reconciliation, user search, among other database management tasks or any combination thereof. Indeed, the principles detailed herein are not limited to data records pertaining to entities, but rather may include data records representing one or more of any number of subjects, such as transaction records, electronic messages (e.g., emails, internet messaging or chat messages, SMS and/or MMS messages, among others or any combination thereof), or any other data records or any combination thereof.

In some embodiments, the illustrative instance module may receive the at least one entity record associated with at least one candidate entity record from a local storage device 201, a local network database 108, a cloud platform 118, a mobile computing device 122, a personal computing device 123, or any similar device capable of storing at least one entity record corresponding to at least one candidate entity record. For example, the entity records may be retrieved from one or more databases of a financial institution, merchant, or other system maintaining entity data for entities for which they are associated.

In some embodiments at Step 304, the illustrative instance module 200 utilizing at least one processor(s) 209 may determine a respective set of candidate entity record feature vectors associated with the at least one candidate entity record based on at least one of the entries of multiple data record entries. For example, the instance module 200 may extract the data items of each candidate entity record and encode the data items in a corresponding feature vector. The data items may include, e.g., a business's legal name, an address of a store, headquarters or other place of business, a telephone number, a contact person, a merchant category code, among others or any combination thereof.

In some embodiments the illustrative instance module 200 utilizing at least one processor(s) 209 may determine at least one group of data record entries feature vectors associated with at least one second set of data entry records. In some embodiments the illustrative instance module 200 utilizing the at least one processor(s) 209 may determine a similarity of multiple data record entries with multiple candidate entity records by determining a semantic similarity of the embeddings of the feature vectors, or it may determine a similarity based on a classifier or any similar type of measure capable of determining a similarity. In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments at Step 306, the illustrative instance module 200 may be configured with at least one entity feature engine 217 capable of processing the feature vectors of the multiple data records associated with each respective candidate entity record and determining the embeddings of the feature vectors of multiple data records associated with each respective candidate entity record.

In some embodiments the at least one entity feature engine 217 of the illustrative instance module 200 may be configured to map clusters based on the at least one group of data record entries feature vectors associated with the respective set of candidate entity record feature vectors, each cluster representing a candidate entity record and the associated multiple data record entries. In some embodiments, the instance module 200 may utilize any type of model capable of mapping clusters of feature vectors such as k-means, centroid, DBSCAN, fuzzy clustering, spectral clustering, expectation maximization or any similar type of clustering model that is capable of clustering feature vectors of entity records.

In some embodiments at Step 308, the illustrative instance module 200 may be configured with at least one ingestion engine 218 capable of indexing into an elastic search environment the at least one group of data record entries feature clusters associated with each respective candidate entity record. In some embodiments the at least one processor(s) 209 of the illustrative instance module 200 may employ delimiter-based parsing or fixed-length parsing, or combinations thereof, to parse the clusters of data associated with each respective candidate entity record into an elastic search environment. Thus, the entity associated with each group of data record entries feature clusters may be searchable in an efficient manner where individual entities are deduplicated and formatted in a manner configured for efficient searching.

In some embodiments at Step 310, the at least one processor(s) of the illustrative instance module 200 may use at least one particular candidate entity record to search the elastic search space for a matching cluster based on the at least one group of data record entries feature clusters. To search the elastic search space, the at least one processor(s) may determine a confidence interval of each cluster associated with the at least one respective candidate entity record based at least in part on an attribute of the at least one group of data record entries having an exact match with an entry of a pre-determined list and indexed in the enhanced elastic search environment. In some embodiments the confidence interval may be determined by employing a method of moments where the quantity to be estimated is the population mean of each cluster of the data record entries associated with a candidate entity record, in which case one possible estimate is the sample mean. The sample variance of each respective cluster may be utilized to determine a population variance, the confidence interval for the true mean of each respective cluster may be centered on the sample mean with a width which is a multiple of the square root of the sample variance. Accordingly, for example, a user may search a database of entity records for a particular entity in an efficient manner due to the efficiently represented elastic search space via clustering the entity records for merging and/or deduplication.

In some embodiments, the illustrative instance module 200 may utilize a display engine 220 capable of displaying multiple candidate entity records and associated information such as statistics, attributes of at least one group of data record entries, confidence intervals associated with multiple candidate entity records and the like or any combination thereof.

In some embodiments at Step 310, the illustrative instance module 200 may utilize the at least one processor(s) 209 to determine a high priority, a mid-priority, and a low priority confidence interval representing a degree of relevance or interest in the associated entity based on one or more attributes, such as relevance to a particular activity, behavior or interest, or to a particular error, risk or anomaly condition. In some embodiments the ranges may be represented as a high priority where a 95% confidence interval may be predicted for data record entries associated with the respective candidate entity record, a mid-priority where a 75% confidence interval may be predicted for data record entries associated with the respective candidate entity record, and a low priority where a 50% confidence interval may be predicted for data record entries associated with the respective candidate entity record.

In some embodiments at Step 310, the illustrative instance module 200 may utilize at least one of the confidence intervals based at least in part on an attribute of at least one group of data record entries associated with a respective candidate entity record is determined to have an exact match to an entry of a pre-determined list, the entries of the pre-determined lists may be associated with categories, and the categories associated with high priority, mid-priority, and low priority confidence intervals. In some embodiments, an attribute of at least one group of data record entries associated with a respective candidate entity record may be determined to have an exact match with an entry of a high priority pre-determined list associated with a high priority confidence interval in the case where the attribute is related to high risk activities where an error in entity record resolution represents a significant risk for example, a line of credit, a credit card application, a loan application, a credit score inquiry, or any similar attribute that requires finer resolution of entity record data. In some embodiments, an attribute of at least one group of data record entries associated with a respective candidate entity record may be determined to have an exact match to an entry of a mid-priority pre-determined list, it may be determined to be associated with a mid-priority confidence interval in the case where the purpose of resolving the entity record is related to mid-risk activities such as a marketing campaign that utilizes telecommunications means for marketing to a group of entities that may be resolved from multiple candidate entity records. The mid-priority list may include a group of entities to which for example physical mail may be directed. The mid-priority list may include any type of attribute of at least one group of data record entries that does not represent a significant risk in the case of a high proportion of errors in the resolution of multiple entity records, but a level of risk tolerance is acceptable. In some embodiments, an attribute of at least one group of data record entries associated with a respective candidate entity record may be determined to have an exact match to a low priority pre-determined list it may be determined to be associated with a low priority confidence interval in the case where the purpose of resolving the entity record is related to activities that utilize email as a form of communication, it may include activities such as automated telecommunications, or any similar type of activities that represent low risk activities and a high level of risk tolerance is acceptable.

In some embodiments at Step 312, the illustrative instance module 200 may utilize the at least one processor(s) 209 to determine at least one updated group of the at least one group of data record entries feature vectors based on an entry a user 124 from an input device interface 213 and/or automatically as described above. In the case where a high priority is determined, the updated group of data record entries from the previously processed group of data record entries may be limited to a group of between 1-1,000 entries, in the case where a mid-priority is determined, the updated group of record entries from the previously processed group of data record entries may be limited to a group of between 1,000-5,000, and in the case where a low priority is determined, the updated group of record entries from the previously processed group of data record entries may be limited to a group of between 5,000-10,000 entries.

In some embodiments at Step 314, the illustrative instance module 200 may utilize a display engine 220 to display on an output device interface 207 at least one data record entries associated with at least one candidate entity records and corresponding confidence intervals and associated information such as statistics, attributes of at least one group of data record entries, confidence intervals associated with multiple candidate entity records and the like or any combination thereof.

Figure 4:
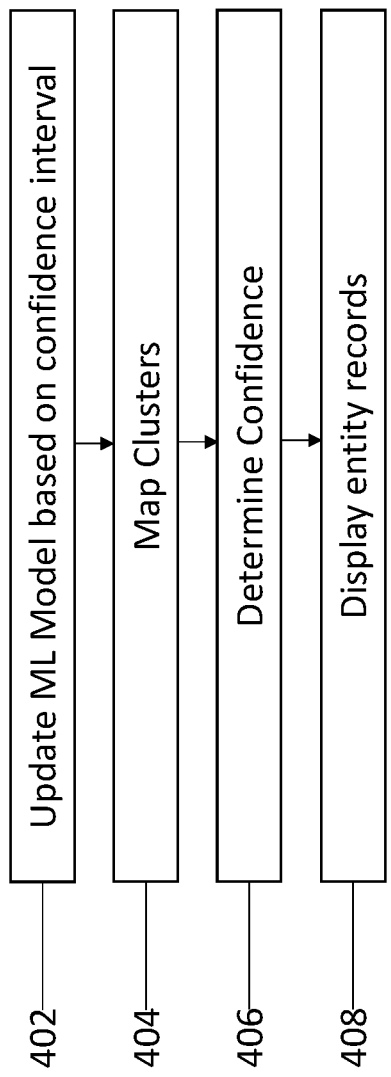
FIG. 4 is a flowchart illustrating operational steps of automatically resolving entity records utilizing natural language processing models in an enhanced elastic search environment, in accordance with one or more embodiments of the present disclosure.

FIG. 4 is a flowchart illustrating operational steps of process 400 of a system capable of instance dependent optimization of resolving entity records utilizing natural language processing models, in accordance with one or more embodiments of the present disclosure.

In some embodiments at Step 402, the illustrative instance module 200 may utilize the at least one processor(s) 209 to automatically determine an update for at least one parameter of the at least one fine feature engine 219, or it may be based on an input from a user 124 from an input device interface 213 or it may be determined automatically as described above. The update may be based on at least one entry of a user 124 from an input device interface 213 and/or automatically determined (e.g., as described above) exactly matching an attribute from the pre-determined list such as for example, in the case where the at least one entry of a user 124 from an input device interface 213 exactly matches an entry from the pre-determined list in the high priority category the at least one processor(s) 209 determines a new set of parameters for the at least one hidden layer of the at least one fine feature engine 219 where the connections of the at least one hidden layer are decreased. In some embodiments the illustrative instance module 200 may utilize the at least one processor(s) 209 to determine at least a parameter of the at least one entity feature engine 217 by updating at least one parameter of the at least one entity feature engine 217 based on at least one entry from a pre-determined list in a similar manner.

In some embodiments at Step 404, the illustrative instance module 200 may utilize at least one fine feature engine 219 to map a second set of clusters of the updated group of data record entries feature vectors associated with the respective set of candidate entity record feature vectors. In some embodiments the illustrative instance module 200 may utilize at least one updated machine learning model to map a second set of clusters of the updated group of data record entries feature vectors associated with the respective set of candidate entity records feature vectors.

In some embodiments at Step 406 the at least one processor(s) of the illustrative instance module 200 may utilize the at least one processor(s) to determine a confidence interval of each cluster associated with the map a second set of clusters of the updated group of data record entries feature vectors associated with the respective set of candidate entity records feature vectors.

In some embodiments at Step 408, the illustrative instance module 200 may utilize a display engine 220 to display on an output device interface 207 at least one data record entries associated with at least one candidate entity records and corresponding confidence intervals and/or associated information such as statistics, attributes of at least one group of data record entries, confidence intervals associated with multiple candidate entity records and the like or any combination thereof. In some embodiments the data records entries associated with the at least one entity record, and associated information has been automatically optimizes based on the (e.g., instance dependent) characteristics of the entity record. The system automatically updated the parameters of at least one machine learning model, to optimize data record entry processing while optimizing the data management systems that handle processing of data record entries. The results displayed demonstrate precise data refinement of the information processing system, reduced and/or completely automated training of the model (e.g., no human intervention) increasing the speed of the information processing system by a minimum of 2 folds while simultaneously reducing memory storage capacity requirements.

Figure 5:
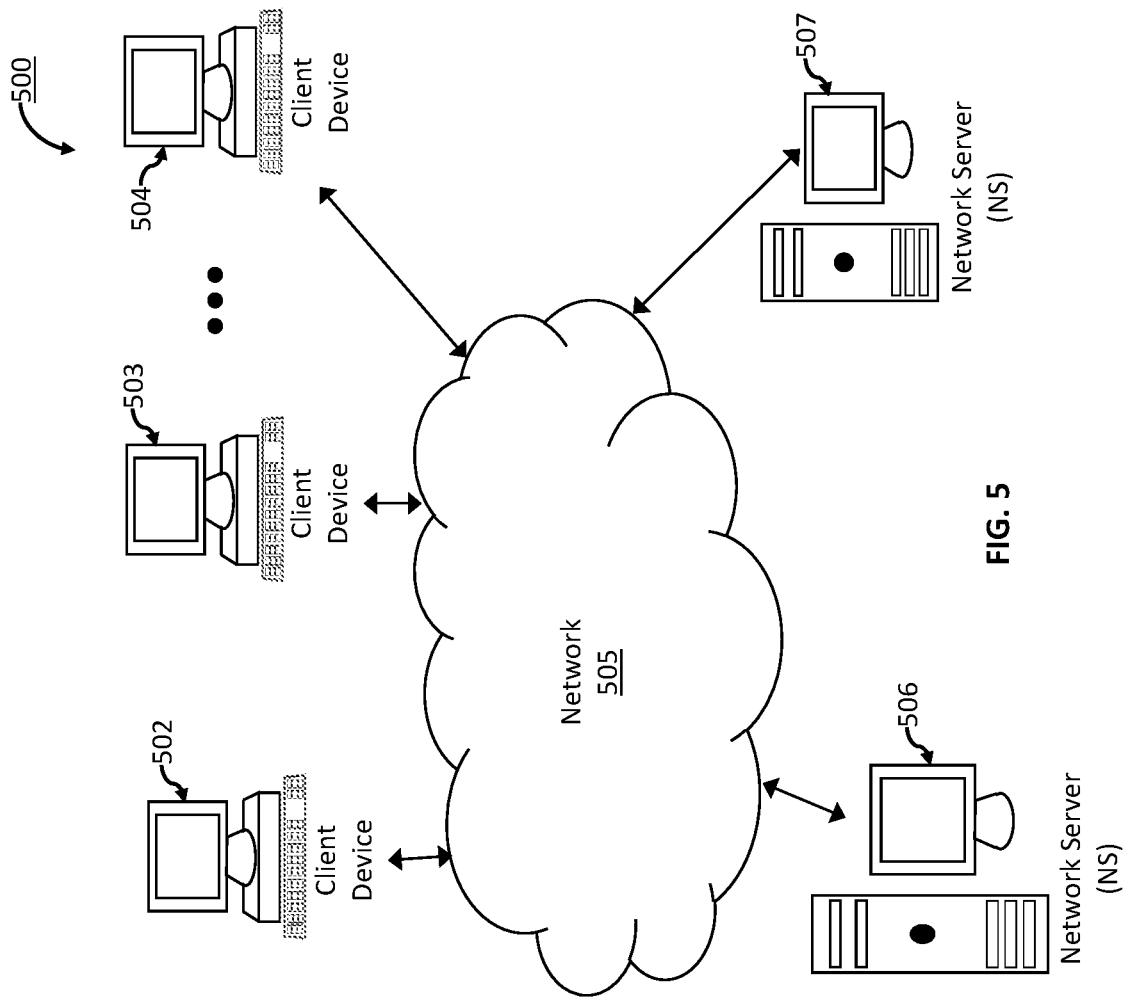
FIG. 5 depicts a block diagram of an exemplary computer-based system and platform 500 in accordance with one or more embodiments of the present disclosure.

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, client device 502, client device 503 through client device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the client devices 502 through 504 may be personal computers, multiprocessor systems, microprocessor-based or programmable consumer electronics, network PCs, and the like. In some embodiments, one or more client devices within client devices 502 through 504 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more client devices within client devices 502 through 504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 502 through 504 may include may run one or more applications, such as Internet browsers, mobile applications, voice calls, video games, videoconferencing, and email, among others. In some embodiments, one or more client devices within client devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 502 through 504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 502 through 504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 502 through 504.

In some embodiments and, optionally, in combination of any embodiment described above or below, for example, one or more exemplary computing client devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

At least some aspects of the present disclosure will now be described with reference to the following numbered clauses.

Clause 1. A computer-implemented method comprising: receiving, by at least one processor, a plurality of data records associated with a plurality of entity records, each entity record having at least one data entry, the plurality of data records corresponding to at least one candidate entity record; wherein each of the plurality of data record entries comprises: i) a quantity data record entry representing a quantity associated with the at least one candidate entity record; ii) a name data record entry representing a name associated with the at least one candidate entity record; iii) an address data record entry representing an address associated with at least one candidate entity record; iv) a second set of data entry records representing at least one attribute associated with at least one candidate entity record; identifying, by at least one processor, a respective set of candidate entity record feature vectors associated with the at least one candidate entity record based on at least one of the entries of the plurality of data record entries; identifying, by at least one processor, at least one group of data record entries feature vectors associated with the second set of data entry records; utilizing, by at least one processor, at least one machine learning model to map clusters based on the at least one group of data record entries feature vectors associated with the respective set of candidate entity record feature vectors; utilizing, by at least one processor, an ingestion module to index the at least one group of data record entries feature vector clusters associated with the respective candidate entity record into an elastic search; wherein the ingestion module is configured to index the at least one group of data entries clusters associated with the respective candidate entity record clusters; determining, confidence bands of each cluster associated with the at least one respective candidate entity record based at least in part on an attribute of the at least one group of data record entries; determining at least one updated machine learning model by updating at least one parameter of the at least one machine learning model based on at least one entry from a pre-determined list; determining at least one updated group of the at least one group of data record entries feature vectors based on at least one entry from a pre-determined list; utilizing at least one updated machine learning model to map a second set of clusters of the updated group of data record entries feature vectors associated with the respective set of candidate entity records feature vectors; determining updated confidence bands of each cluster of the updated group of data record entries associated with the respective set of candidate entity records displaying each cluster of the updated group of data record entries associated with the respective candidate entity records and corresponding updated confidence bands.

Clause 2. The computer-implemented method of clause 1, wherein the at least one entry from a user is from a high priority category of the pre-determined list, the updated group of data record entries is between 1-1000.

Clause 3. The computer-implemented method of clause 1, wherein the at least one entry from a user is from a mid-priority category of the pre-determined list, the updated group of data record entries is between 1000-5000.

Clause 4. The computer-implemented method of clause 1, wherein the at least one entry from a user is from a low priority category of the pre-determined list, the updated group of data record entries is between 5000-10,000.

Clause 5. The computer-implemented method of clause 1, wherein the at least one entry from a user is from a high priority category of the pre-determined list, connection strengths are decreased of at least one hidden layer of the updated machine learning model.

Clause 6. The computer-implemented method of clause 1, wherein the at least one entry from a user is from a high priority category of the pre-determined list, weight strengths are decreased of at least one hidden layer of the updated machine learning model.

Clause 7. A system comprising: a non-transient computer memory, storing software instructions; and a least one processor of a first computing devices associated with a user; wherein, then at least one processor executes the software instructions, the first computing device is programmed to: receive, by at least one processor, a plurality of data records associated with a plurality of entity records, each entity record having at least one data entry, the plurality of data records corresponding to at least one candidate entity record; wherein each of the plurality of data record entries comprises: i) a quantity data record entry representing a quantity associated with the at least one candidate entity record; ii) a name data record entry representing a name associated with the at least one candidate entity record; iii) an address data record entry representing an address associated with at least one candidate entity record; iv) a second set of data entry records representing at least one attribute associated with at least one candidate entity record; identify, by at least one processor, a respective set of candidate entity record feature vectors associated with the at least one candidate entity record based on at least one of the entries of the plurality of data record entries; identify, by at least one processor, at least one group of data record entries feature vectors associated with the second set of data entry records; utilize, by at least one processor, at least one machine learning model to map clusters based on the at least one group of data record entries feature vectors associated with the respective set of candidate entity record feature vectors; utilize, by at least one processor, an ingestion module to index the at least one group of data record entries feature vector clusters associated with the respective candidate entity record into an elastic search; wherein the ingestion module is configured to index the at least one group of data entries clusters associated with the respective candidate entity record clusters; determine confidence bands of each cluster associated with the at least one respective candidate entity record based at least in part on an attribute of the at least one group of data record entries; determine at least one updated machine learning model by updating at least one parameter of the at least one machine learning model based on at least one entry from a pre-determined list; determine at least one updated group of the at least one group of data record entries feature vectors based on at least one entry from an pre-determined list; utilize at least one updated machine learning model to map a second set of clusters of the updated group of data record entries feature vectors associated with the respective set of candidate entity records feature vectors; determine updated confidence bands of each cluster of the updated group of data record entries associated with the respective set of candidate entity records displaying each cluster of the updated group of data record entries associated with the respective candidate entity records and corresponding updated confidence bands.

Clause 8. The system of clause 7, wherein the at least one entry from a user is from a high priority category of the pre-determined list, the updated group of data record entries is between 1-1000.

Clause 9. The system of clause 7, wherein the at least one entry from a user is from a mid-priority category of the pre-determined list, the updated group of data record entries is between 1000-5000.

Clause 10. The system of clause 7, wherein the at least one entry from a user is from a low priority category of the pre-determined list, the updated group of data record entries is between 5000-10,000.

Clause 11. The system of clause 7, wherein the at least one entry from a user is from a high priority category of the pre-determined list, connection strengths are decreased of at least one hidden layer of the updated machine learning model.

Clause 12. The system of clause 7, wherein the at least one entry from a user is from a high priority category of the pre-determined list, weight strengths are decreased of at least one hidden layer of the updated machine learning model.

Clause 13. At least one computer-readable storage medium having encoded thereon software instructions that, when executed by at least one processor, cause the at least one processor to perform steps to: receive, by at least one processor, a plurality of data records associated with a plurality of entity records, each entity record having at least one data entry, the plurality of data records corresponding to at least one candidate entity record; wherein each of the plurality of data record entries comprises: i) a quantity data record entry representing a quantity associated with the at least one candidate entity record; ii) a name data record entry representing a name associated with the at least one candidate entity record; iii) an address data record entry representing an address associated with at least one candidate entity record; iv) a second set of data entry records representing at least one attribute associated with at least one candidate entity record; identify, by at least one processor, a respective set of candidate entity record feature vectors associated with the at least one candidate entity record based on at least one of the entries of the plurality of data record entries; identify, by at least one processor, at least one group of data record entries feature vectors associated with the second set of data entry records; utilize, by at least one processor, at least one machine learning model to map clusters based on the at least one group of data record entries feature vectors associated with the respective set of candidate entity record feature vectors; utilize, by at least one processor, an ingestion module to index the at least one group of data record entries feature vector clusters associated with the respective candidate entity record into an elastic search; wherein the ingestion module is configured to index the at least one group of data entries clusters associated with the respective candidate entity record clusters; determine confidence bands of each cluster associated with the at least one respective candidate entity record based at least in part on an attribute of the at least one group of data record entries; determine at least one updated machine learning model by updating at least one parameter of the at least one machine learning model based on at least one entry from a pre-determined list; determine at least one updated group of the at least one group of data record entries feature vectors based on at least one entry from a pre-determined list; utilize at least one updated machine learning model to map a second set of clusters of the updated group of data record entries feature vectors associated with the respective set of candidate entity records feature vectors; determine updated confidence bands of each cluster of the updated group of data record entries associated with the respective set of candidate entity records displaying each cluster of the updated group of data record entries associated with the respective candidate entity records and corresponding updated confidence bands.

Clause 14. The at least one computer-readable storage medium of clause 13, wherein the at least one entry from a user is from a high priority category of the pre-determined list, the updated group of data record entries is between 1-1000.

Clause 15. The at least one computer-readable storage medium of clause 13, wherein the at least one entry from a user is from a mid-priority category of the pre-determined list, the updated group of data record entries is between 1000-5000.

Clause 16. The at least one computer-readable storage medium of clause 13, wherein the at least one entry from a user is from a low priority category of the pre-determined list, the updated group of data record entries is between 5000-10,000.

Clause 17. The at least one computer-readable storage medium of clause 13, wherein the at least one entry from a user is from a high priority category of the pre-determined list, connection strengths are decreased of at least one hidden layer of the updated machine learning model.

Clause 18. The at least one computer-readable storage medium of clause 13, wherein the at least one entry from a user is from a high priority category of the pre-determined list, weight strengths are decreased of the at least on hidden layer of the updated machine learning model.

Clause 19. The at least one computer-readable storage medium of clause 13, wherein the at least one entry from a user is from a high priority category of the pre-determined list, weights and connections of the updated machine learning model are simultaneously decreased.

Clause 20. The at least one computer-readable storage medium of clause 13, wherein the at least one entry from a user is from a high priority category of the pre-determined list, weights and connections of the updated machine learning model are simultaneously decreased and the updated group of data records entries is between 1-1000.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect or functionality of various embodiments described herein can be performed in real-time and dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and linguistic relatives or derivatives, mean that certain events or actions can be triggered or occur without any human intervention. In some embodiments, events or actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, illustrative, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when multiple NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed, programmed or configured to manage or control other software and hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and computing software languages (e.g., C++, Objective-C, Swift, Java, JavaScript, Python, Perl, QT, etc.).

In some embodiments, one or more of illustrative computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of illustrative computer-based systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc. In some embodiments, as detailed herein, one or more of illustrative computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) Open VMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, illustrative software specifically programmed in accordance with one or more principles of the present disclosure may be downloadable from a network, for example, a website, as a stand-alone product or as an add-in package for installation in an existing software application. For example, illustrative software specifically programmed in accordance with one or more principles of the present disclosure may be available as a client-server software application, or as a web-enabled software application. For example, illustrative software specifically programmed in accordance with one or more principles of the present disclosure may be embodied as a software package installed on a hardware device.

In some embodiments, illustrative computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems of the present disclosure may be configured to be utilized in various applications which may include, but not limited to, gaming, mobile-device games, video chats, video conferences, live video streaming, video streaming and augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device or system of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems of the present disclosure may be configured to securely store or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added, or any desired steps may be eliminated).

What is claimed is:

1. A computer-implemented method comprising:
receiving, by at least one processor, a plurality of data records associated with a plurality of entity records, each entity record having at least one data entry, the plurality of data records corresponding to at least one candidate entity record;
wherein each of the plurality of data record entries comprises:
i) a quantity data record entry representing a quantity associated with the at least one candidate entity record;
ii) a name data record entry representing a name associated with the at least one candidate entity record;
iii) an address data record entry representing an address associated with at least one candidate entity record;
iv) a second set of data entry records representing at least one attribute associated with at least one candidate entity record;
identifying, by at least one processor, a respective set of candidate entity record feature vectors associated with the at least one candidate entity record based on at least one of the entries of the plurality of data record entries;
identifying, by at least one processor, at least one group of data record entries feature vectors associated with the second set of data entry records;
utilizing, by at least one processor, at least one machine learning model to map clusters based on the at least one group of data record entries feature vectors associated with the respective set of candidate entity record feature vectors;
utilizing, by at least one processor, an ingestion module to index the at least one group of data record entries feature vector clusters associated with the respective candidate entity record into an elastic search;
wherein the ingestion module is configured to index the at least one group of data entries clusters associated with the respective candidate entity record clusters;
determining, confidence bands of each cluster associated with the at least one respective candidate entity record based at least in part on an attribute of the at least one group of data record entries;
determining at least one updated machine learning model by updating at least one parameter of the at least one machine learning model based on at least one entry from a pre-determined list;
wherein the at least one entry from a user is from a high priority category of the pre-determined list, weight strengths are decreased of at least one hidden layer of the updated machine learning model;
determining at least one updated group of the at least one group of data record entries feature vectors based on at least one entry from a pre-determined list;
utilizing at least one updated machine learning model to map a second set of clusters of the updated group of data record entries feature vectors associated with the respective set of candidate entity records feature vectors;

determining updated confidence bands of each cluster of the updated group of data record entries associated with the respective set of candidate entity records; and displaying each cluster of the updated group of data record entries associated with the respective candidate entity records and corresponding updated confidence bands.

2. The computer-implemented method of claim 1, wherein the at least one entry from a user is from a high priority category of the pre-determined list, the updated group of data record entries is between 1-1000.

3. The computer-implemented method of claim 1, wherein the at least one entry from a user is from a mid-priority category of the pre-determined list, the updated group of data record entries is between 1000-5000.

4. The computer-implemented method of claim 1, wherein the at least one entry from a user is from a low priority category of the pre-determined list, the updated group of data record entries is between 5000-10,000.

5. The computer-implemented method of claim 1, wherein the at least one entry from a user is from a high priority category of the pre-determined list, connection strengths are decreased of at least one hidden layer of the updated machine learning model.

6. A system comprising:
a non-transient computer memory, storing software instructions; and
at least one processor of a first computing devices associated with a user;
wherein, then at least one processor executes the software instructions, the first computing device is programmed to:
receive, by at least one processor, a plurality of data records associated with a plurality of entity records, each entity record having at least one data entry, the plurality of data records corresponding to at least one candidate entity record;
wherein each of the plurality of data record entries comprises:
i) a quantity data record entry representing a quantity associated with the at least one candidate entity record;
ii) a name data record entry representing a name associated with the at least one candidate entity record;
iii) an address data record entry representing an address associated with at least one candidate entity record;
iv) a second set of data entry records representing at least one attribute associated with at least one candidate entity record;
identify, by at least one processor, a respective set of candidate entity record feature vectors associated with the at least one candidate entity record based on at least one of the entries of the plurality of data record entries;
identify, by at least one processor, at least one group of data record entries feature vectors associated with the second set of data entry records;
utilize, by at least one processor, at least one machine learning model to map clusters based on the at least one group of data record entries feature vectors associated with the respective set of candidate entity record feature vectors;
utilize, by at least one processor, an ingestion module to index the at least one group of data record entries feature vector clusters associated with the respective candidate entity record into an elastic search;

wherein the ingestion module is configured to index the at least one group of data entries clusters associated with the respective candidate entity record clusters;
determine confidence bands of each cluster associated with the at least one respective candidate entity record based at least in part on an attribute of the at least one group of data record entries;
determine at least one updated machine learning model by updating at least one parameter of the at least one machine learning model based on at least one entry from a pre-determined list;
wherein the at least one entry from a user is from a high priority category of the pre-determined list, weight strengths are decreased of at least one hidden layer of the updated machine learning model;
determine at least one updated group of the at least one group of data record entries feature vectors based on at least one entry from a pre-determined list;
utilize the at least one updated machine learning model to map a second set of clusters of the updated group of data record entries feature vectors associated with the respective set of candidate entity records feature vectors;
determine updated confidence bands of each cluster of the updated group of data record entries associated with the respective set of candidate entity records; and
displaying each cluster of the updated group of data record entries associated with the respective candidate entity records and corresponding updated confidence bands.

7. The system of claim 6, wherein the at least one entry from a user is from a high priority category of the pre-determined list, the updated group of data record entries is between 1-1000.

8. The system of claim 6, wherein the at least one entry from a user is from a mid-priority category of the pre-determined list, the updated group of data record entries is between 1000-5000.

9. The system of claim 6, wherein the at least one entry from a user is from a low priority category of the pre-determined list, the updated group of data record entries is between 5000-10,000.

10. The system of claim 6, wherein the at least one entry from a user is from a high priority category of the pre-determined list, connection strengths are decreased of at least one hidden layer of the updated machine learning model.

11. At least one computer-readable storage medium having encoded thereon software instructions that, when executed by at least one processor, cause the at least one processor to perform steps to:
utilizing, by at least one processor, at least one machine learning model to map clusters of entity records based on a similarity measure between at least one data entry of each entity record of a plurality of entity records to form at least one group of data records associated with at least one attribute;
utilizing, by at least one processor, an ingestion module to index the at least one group of data record entries feature vector clusters associated with a respective candidate entity record into at least one search index;
wherein the ingestion module is configured to index the at least one group of data entries clusters associated with the respective candidate entity record clusters;

determining, by at least one processor, confidence bands of each cluster associated with the at least one group of data records based at least in part on the at least one attribute;

determining, in real-time, by at least one processor, in response to at least one entry affecting the at least one attribute, updated confidence bands of each cluster of the updated group of data record entries based at least in part on the at least one attribute;

determine at least one updated machine learning model by updating at least one parameter of the at least one machine learning model based on at least one entry from a pre-determined list;
wherein the at least one entry from a user is from a high priority category of the pre-determined list, weight strengths are decreased of at least one hidden layer of the updated machine learning model; and displaying, by at least one processor, each cluster of the updated group of data record entries associated with the respective candidate entity records and corresponding updated confidence bands.

12. The at least one computer-readable storage medium of claim 11, wherein the at least one entry from a user is from a high priority category, the updated group of data record entries is between 1-1000.

13. The at least one computer-readable storage medium of claim 11, wherein the at least one entry from a user is from a mid-priority category, the updated group of data record entries is between 1000-5000.

14. The at least one computer-readable storage medium of claim 11, wherein the at least one entry from a user is from a low priority category, the updated group of data record entries is between 5000-10,000.

15. The at least one computer-readable storage medium of claim 11, wherein the at least one entry from a user is from a high priority category, connection strengths are decreased of at least one hidden layer of the updated machine learning model.

16. The at least one computer-readable storage medium of claim 11, wherein the at least one entry from a user is from a high priority category, weights and connections of the updated machine learning model are simultaneously decreased.

17. The at least one computer-readable storage medium of claim 11, wherein the at least one entry from a user is from a high priority category, weights and connections of the updated machine learning model are simultaneously decreased and the updated group of data records entries is between 1-1000.

* * * * *